United States Patent
Haga et al.

(10) Patent No.: US 7,454,652 B2
(45) Date of Patent: Nov. 18, 2008

(54) SYSTEM FOR AND METHOD OF MANAGING RESOURCE OPERATIONS

(75) Inventors: Futoshi Haga, Sagamihara (JP); Yutaka Kudo, Yokohama (JP); Shuji Fujino, Ayase (JP)

(73) Assignee: Hitachi, Ltd., Tokyo (JP)

( * ) Notice: Subject to any disclaimer, the term of this patent is extended or adjusted under 35 U.S.C. 154(b) by 511 days.

(21) Appl. No.: 11/046,438

(22) Filed: Jan. 27, 2005

(65) Prior Publication Data

US 2005/0192969 A1 Sep. 1, 2005

(30) Foreign Application Priority Data

Jan. 30, 2004 (JP) ............................ 2004-024250

(51) Int. Cl.
*G06F 11/00* (2006.01)
(52) U.S. Cl. ................. 714/4; 714/25; 714/27
(58) Field of Classification Search ............... 714/4, 714/25, 47
See application file for complete search history.

(56) References Cited

U.S. PATENT DOCUMENTS

2005/0160318 A1* 7/2005 Di Luoffo et al. ............ 714/25

FOREIGN PATENT DOCUMENTS

| JP | 11-066018 | 3/1999 |
|----|-----------|--------|
| JP | 2002-024192 | 1/2002 |
| JP | 2002-024192 A | 1/2002 |
| JP | 2003-067351 A | 3/2003 |
| JP | 2003-124976 | 4/2003 |

OTHER PUBLICATIONS

"The Whole Story of Sun Infrastructure Solution," SUN Developers Connection Solution Guide 2003-2004, pp. 6-17 (Jun. 30, 2003).
Japan Patent Office (JPO) office action for JPO patent application 2004-024250 (May 20, 2008).

* cited by examiner

*Primary Examiner*—Robert Beausoliel
*Assistant Examiner*—Charles Ehne
(74) *Attorney, Agent, or Firm*—Townsend and Townsend and Crew LLP

(57) ABSTRACT

In a storage system including an information processing apparatus and a storage apparatus that is communicably connected to the information processing apparatus via a communication network and that writes or reads data to or from a storage device in response to a data write/read request transmitted from the information processing apparatus, real resource operations are managed, with virtual resources set by assigning the real resources and the settings changed in conformity with the operating status of the real resources.

16 Claims, 10 Drawing Sheets

APPLICATION DATA 211

| AP_ID | AP NAME | CONFIGURATION FILE | SLO SETUP FILE | PRIORITY |
|---|---|---|---|---|
| 001 | NUMERIC CALCULATION | Calc. app | Calc. slo | HIGH |
| 002 | IMAGE ANALYSIS | ImageAnalyze. app | ImageAnalyze. slo | MEDIUM |
| 003 | INVENTORY MANAGEMENT | InventoryManager. app | InventoryManager. slo | LOW |
| ⋮ | ⋮ | ⋮ | ⋮ | ⋮ |

Fig. 3

POLICY DATA 221

| POLICY ID | POLICY TYPE | CONDITION | ACTION | DETAILS OF ACTION |
|---|---|---|---|---|
| 1 | PERFORMANCE MAINTENANCE POLICY | PERFORMANCE DEGRADATION | EXPAND RESOURCES | UPGRADE ASSIGNMENT OF REAL RESOURCE TO VIRTUAL RESOURCE OF BOTTLENECK PORTION |
| | | OVER PERFORMANCE | REDUCE RESOURCES | RELEASE REAL RESOURCE ASSIGNED TO VIRTUAL RESOURCE OF EXCESS PORTION |
| 2 | FAULT AVOIDANCE POLICY | OCCURRENCE OF EQUIPMENT FAULT | AVOID EQUIPMENT FAULT | CHANGE ASSIGNMENT OF REAL RESOURCE TO FAULTY VIRTUAL RESOURCE |
| | | OCCURRENCE OF CENTER FAULT | AVOID CENTER FAULT | MOVE AP AND VIRTUAL RESOURCE TO SOUND DATA CENTER |
| ⋮ | ⋮ | ⋮ | ⋮ | ⋮ |

Fig. 4

VIRTUAL SYSTEM INFORMATION ⤲ 241

| VIRTUAL SYSTEM ID (511) | ASSIGNED AP_ID (512) | CONFIGURATION VIRTUAL RESOURCE ID (513) |
|---|---|---|
| 100 | 001 | 001 |
| 200 | 002 | 002, 004, 006 |
| 300 | 003 | 003, 005, 007 |
| ⋮ | ⋮ | ⋮ |

Fig. 5

VIRTUAL RESOURCE INFORMATION ⤲ 242

| VIRTUAL RESOURCE ID (611) | PERFORMANCE /CAPACITY (612) | RESOURCE TYPE (613) | VIRTUAL IDENTIFIER (614) | REAL RESOURCE ID (615) |
|---|---|---|---|---|
| 001 | COMPUTER | 1.2GHz/ 512Mbyte | IP ADDRESS: 10.0.0.1 | 012 |
| 002 | COMPUTER | 500MHz/ 256Mbyte | IP ADDRESS: 10.0.0.2 | 013 |
| 003 | COMPUTER | 512MHz/ 256Mbyte | IP ADDRESS: 10.0.0.3 | 014, 015 |
| 004 | STORAGE | 1Tbyte | PARTITION ID: 104 | 023, 024 |
| 005 | STORAGE | 500Gbyte | PARTITION ID: 105 | 025 |
| 006 | NETWORK | 1Gbps | VLAN_ID: 1006 | 035 |
| 007 | NETWORK | 100Mbps | VLAN_ID: 1007 | 036 |
| 008 | NETWORK | 10Mbps | VLAN_ID: 1008 | 037 |
| ⋮ | ⋮ | ⋮ | ⋮ | ⋮ |

SYSTEM FOR AND METHOD OF MANAGING RESOURCE OPERATIONS

CROSS-REFERENCE TO RELATED APPLICATIONS

The present application claims priority upon Japanese Patent Application No. 2004-24250 filed on Jan. 30, 2004, which is herein incorporated by reference.

BACKGROUND OF THE INVENTION

1. Field of the Invention

The present invention relates to a resource operations management system and a resource operations management method.

2. Description of the Related Art

Business systems/applications using Internet/intranet technologies, available in a wide variety, are developed and experiencing a sharp expansion. In response thereto, IT resource management technologies are in strong demand for stable operations of business systems/applications through efficient use of limited IT resources.

The technology under study nowadays as an IT resource management technology is for reducing the management cost of IT resources by dynamically changing IT resource assignments. For instance, the method is being reviewed for stably supplying the user with IT resources by dynamically changing assignments of network resources such as VLAN/VPN to the user with load change in server apparatus/storage apparatus. See, e.g., Japanese Patent Application Laid-open Publication No. 2003-124976. As another example, the method is under study that stably supplies the user with IT resources by dynamically changing CPU resource assignments to the user with change in CPU load. See, e.g., Japanese Patent Application Laid-open Publication Nos. 2002-24192 and 1999-66018.

Thus, the technologies are being reviewed for dynamically changing IT resource assignments to the user in the event of a performance degradation/occurrence of a fault on an individual basis as far as the individual real resources are concerned such as information processing apparatus (computers), storage apparatus and communication network.

Not much progress has been made, however, in the review of the technology/system for assigning a business application of the resources of a storage system (hosting environment)—a system configured including an information processing apparatus (computer), a storage apparatus accessed by the information processing apparatus and a communication network—by virtualizing the whole of the storage system.

If IT resource assignments to the user are changed in the event of a performance degradation/occurrence of a fault using the existing technologies, changes are also required to the business application. This incurs the management cost for the business application administrator, i.e., the hosting environment user, and the hosting environment administrator. On the other hand, changes are occasionally needed to resource assignments to the business application as a result of performance degradation or occurrence of a fault in order to ensure stable operation of the business application, and in this case, setting changes are also required on the business application side.

SUMMARY OF THE INVENTION

In light of the foregoing, it is an object of the present invention to provide a resource operations management system as well as a resource operations management method that allow assignment of resources without changing any settings on the business application side by virtualizing the whole of a storage system (hosting environment), configured including an information processing apparatus (computer), a storage apparatus and a communication network.

In order to achieve the above and other objects, according to a major aspect of the present invention there is provided a resource operations management system for managing the operations of real resources in a storage system that includes an information processing apparatus and a storage apparatus communicably connected to the information processing apparatus via a communication network, the storage apparatus writing or reading data to or from a storage device in response to a data write/read request transmitted from the information processing apparatus, the resource operations management system comprising a virtual resource management unit for setting virtual resources by assigning the real resources; and a real resource management unit for managing the operating status of the real resources, wherein the virtual resource management unit changes the settings in conformity with the operating status of the real resources.

BRIEF DESCRIPTION OF THE DRAWINGS

The above and other objects, aspects, features and advantages of the present invention will become more apparent from the following detailed description when taken in conjunction with the accompanying drawings, in which:

FIG. 3 is a view showing an example of application data 211 described as the embodiment of the present invention;

FIG. 4 is a view showing an example of policy data 221 described as the embodiment of the present invention;

FIG. 5 is a view showing an example of virtual system information 241 described as the embodiment of the present invention;

FIG. 6 is a view showing an example of virtual resource information 242 described as the embodiment of the present invention;

DETAILED DESCRIPTION OF THE INVENTION

Figure 1A:
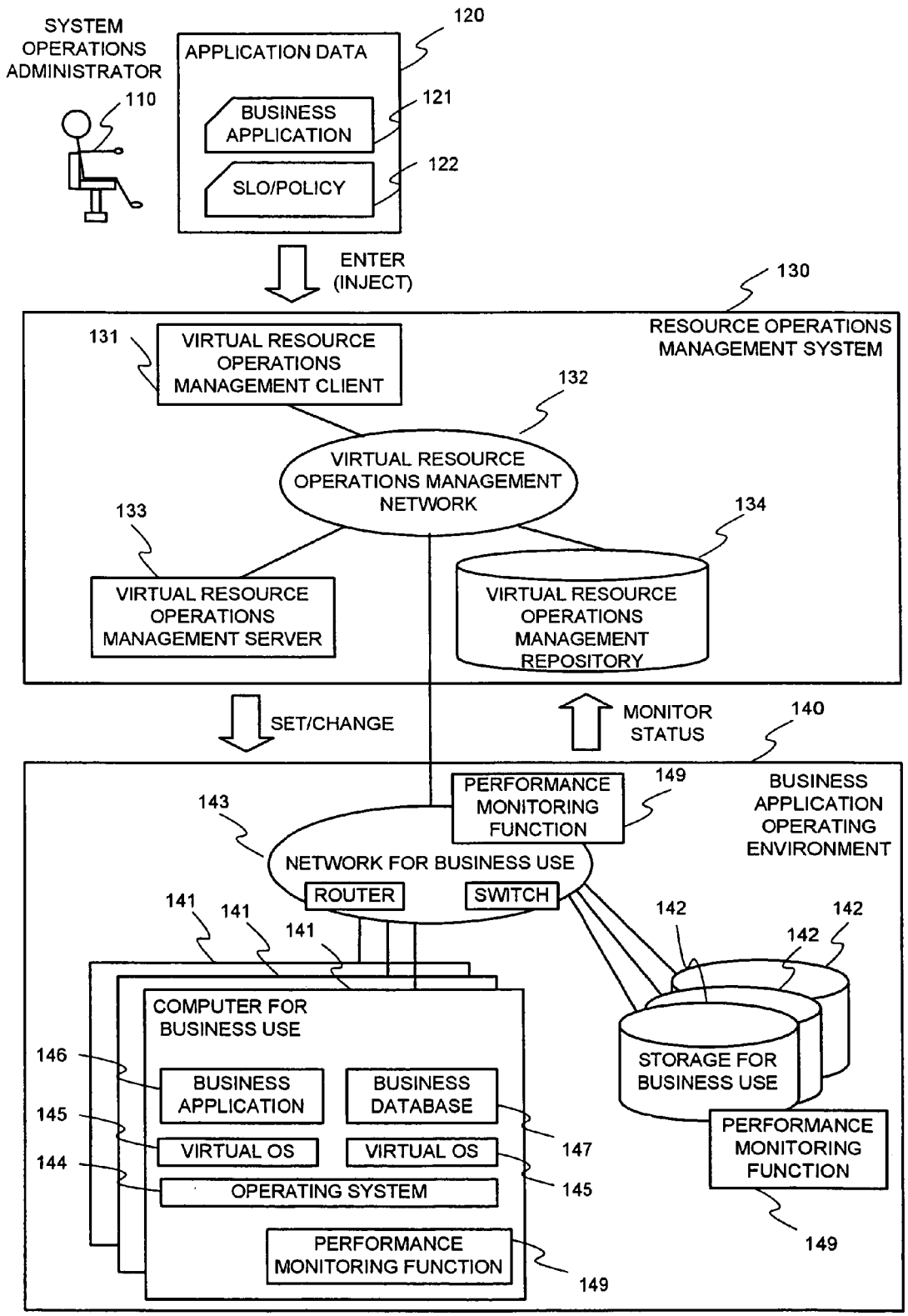
FIG. 1A is a view showing a schematic configuration of a resource operations management system 130 and others described as an embodiment of the present invention.

FIG. 1A shows a schematic configuration of a resource operations management system 130 and others according to the present invention. The resource operations management system 130 is operated in a facility such as a data center or a corporate system center. The resource operations management system 130 is designed to manage real resource assignments in a business application program (business application)'s operating environment (hereinafter referred to as a business application operating environment 140) that implements, for example, a bank's automatic teller system, a flight seat reservation system or a corporate backbone system. It is to be noted that the business application operating environment 140 can be operated at the same site as for the resource operations management system 130 or at a different site.

The resource operations management system 130 sets virtual resources created by virtualizing real resources in the business application operating environment 140 that is configured with the real resources for managing the operating environment. The resource operations management system 130 provides the business application with the virtual resources in place of the real resources. Thus, through virtualization of the real resources and showing of the real resources to the business application as the virtual resources, the configuration of the real resources can be changed without the business application being aware, thus enabling efficient operations of the real resources. This curbs the impact of changes to real resource assignments and others on the business application. The management burden is alleviated on the business application side, reducing the management burden and cost of operations management tasks—tasks aimed at ensuring stable operation of the customer's business application in hosting services at a facility such as a data center.

As shown in FIG. 1A, the resource operations management system 130 is configured including components such as a virtual resource operations management client 131, a virtual resource operations management server 133 and a virtual resource operations management repository 134. These components are connected so as to allow communication with one another by a virtual resource operations management network 132 which is a communication network. On the other hand, these components are each implemented by a computer. Among specific examples of the computer are a personal computer, workstation and mainframe. Each of the virtual resource operations management client 131, the virtual resource operations management server 133 and the virtual resource operations management repository 134 may alternatively be configured with a plurality of computers. The case in which load-balanced cluster or failover cluster software is used is among cases in which the virtual resource operations management client 131, the virtual resource operations management server 133 and the virtual resource operations management repository 134 are each implemented with a plurality of computers.

Figure 1B:
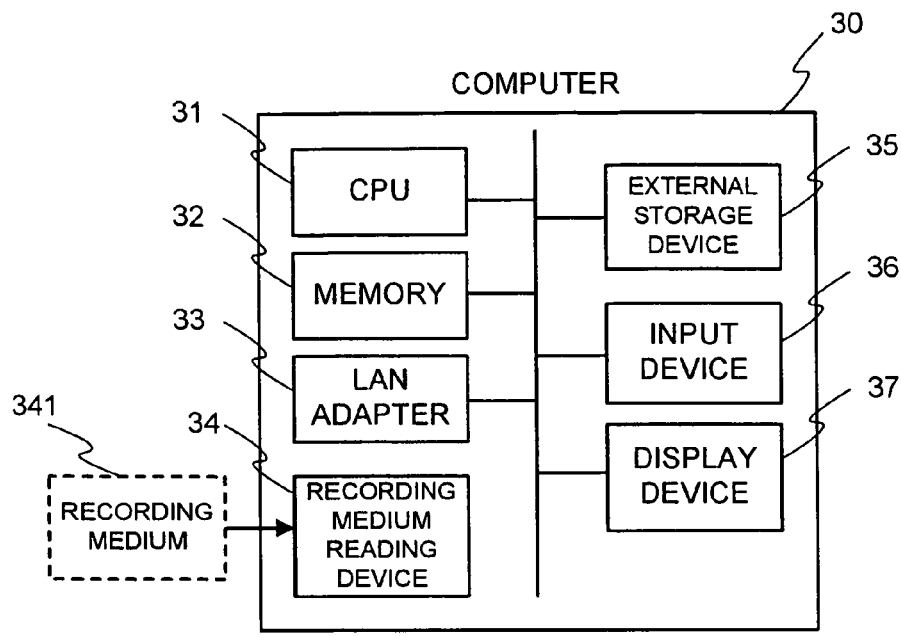
FIG. 1B is a view showing an example of a hardware configuration of a computer 30 used to implement a virtual resource operations management client 131, a virtual resource operations management server 133 and a virtual resource operations management repository 134 described as the embodiment of the present invention.

FIG. 1B shows an example of hardware of a computer 30 used to implement the virtual resource operations management client 131, the virtual resource operations management server 133 and the virtual resource operations management repository 134. In FIG. 1B, the computer 30 is provided with a CPU (Central Processing Unit) 31, a memory 32 such as ROM/RAM, a LAN adapter 33, a recording medium reading device 34 such as a flexible disk drive, CD-ROM device or DVD-ROM device, an external storage device 35 such as a hard disk drive, an input device 36 such as a mouse or keyboard and a display device 37 such as a display.

The CPU 31 governs the overall control of the computer 30. Various functions in the computer 30 are implemented as the CPU 31 executes programs stored in the memory 32. The recording medium reading device 34 is for reading the programs and data recorded in a recording medium 341. The recording medium reading device 34 may be alternatively designed to read the data and programs recorded in the recording medium 341 and store the data and programs to the memory 32 or the external storage device 35. By placing, in the recording medium reading device 34, the recording medium 341 recording the programs for implementing the various functions of the computer 30, the programs can be installed to the management computer 30. A flexible disk, CD-ROM, DVD-ROM, DVD-RAM, semiconductor memory and so on may be used as the recording medium 341. The computer 30 is connected to the virtual resource operations management network 132 via the LAN adapter 33. The LAN adapter 33 is an interface for connecting to the virtual resource operations management network 132. An NIC (Network Interface Card) is used, for example, as the LAN adapter 33.

The virtual resource operations management client 131 provides functions for various operations, settings and control performed when a system operations administrator 110 of the resource operations management system 130 uses the resource operations management system 130. The virtual resource operations management server 133 provides functions for implementing the resource operations management system 130. The virtual resource operations management repository 134 stores various information (data) used by the virtual resource operations management server 133 to manage the business application operating environment 140. A database runs in the virtual resource operations management server 133, with the various information registered and managed by the database.

The system operations administrator 110 enters (e.g., installs, registers, or sets) application data 120 including a business application 121 and an SLO (Service Level Objective: objective to be achieved)/policy 122 via the virtual resource operations management client 131 of the resource operations management system 130, operating various pieces of software in the business application operating environment 140. Here, the business application 121 refers to a program (program file) or data used to implement the business application 121. On the other hand, the SLO/policy 122 refers to data in which the information is written for determining the operating environment of the business application 121 (hereinafter referred to as a policy data). The SLO/policy 122 is set in association with the business application 121. The system operations administrator 110 performs tasks including making and changing the settings of the business application 121 and monitoring the status of the business application 121 in relation to the business application operating environment 140.

On the other hand, the business application operating environment 140, an environment managed by the resource operations management system 130, is configured including various IT resources such as one or more computers for business use 141 (information processing apparatuses), one or more storages for business use 142 (storage apparatuses) and a network for business use 143 that is a communication network configured including routers, hubs and other network equipment for connecting the computers for business use 141 and the storages for business use 142 to allow communication. The network for business use 143 in the business application operating environment 140 is connected to the virtual resource operations management network 132 in the resource operations management system 130 to allow communication. This allows the IT resources to be connected to the virtual resource operations management client 131, the virtual resource operations management server 133, the virtual resource operations management repository 134 and others that make up the resource operations management system 130 to allow communication. Since the virtual resource operations management network 132 and the network for business use 143 are connected to allow communication, the resource operations management system 130 can make or change the settings of various resources in the business application operating environment 140. Additionally, the business application operating environment 140 can supply status monitoring information (data) to the resource operations management system 130.

Figure 1C:
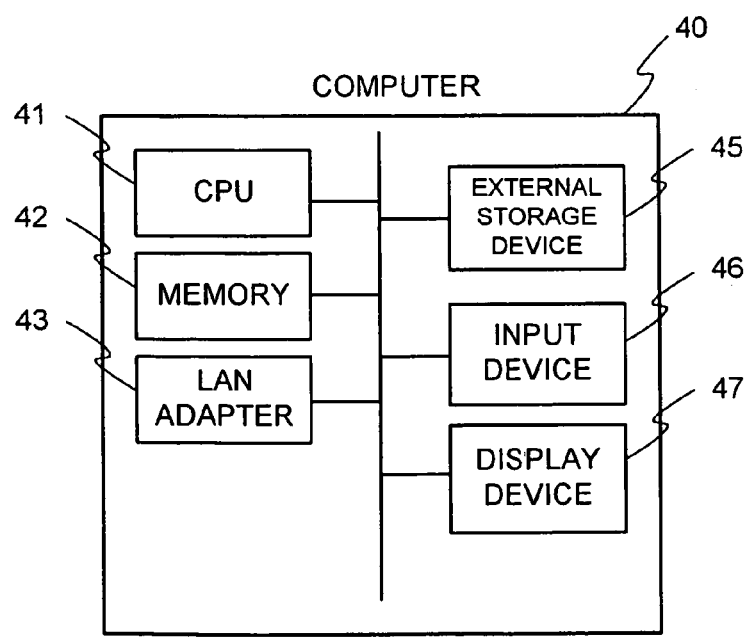
FIG. 1C is a view showing an example of hardware of a typical computer 40 used to implement a computer for business use 141 described as the embodiment of the present invention.

The computers for business use 141 are, for example, personal computers, workstations or mainframes. FIG. 1C shows an example of hardware of a typical computer 40 used to implement the computer for business use 141. The computer for business use 30 is provided with a CPU (Central Processing Unit) 41, a memory 42 such as ROM/RAM, a LAN adapter 43, an external storage device 45 such as a hard disk drive, an input device 46 such as a mouse or keyboard, a display device 47 such as a display and so on. The CPU 41 governs the overall control of the computer 40. Various functions in the computer 40 are implemented as the CPU 41 executes programs stored in the memory 32. The LAN adapter 43 is an interface for connecting to the virtual resource operations management network 132. An NIC (Network Interface Card) is used, for example, as the LAN adapter 43.

Figure 1D:
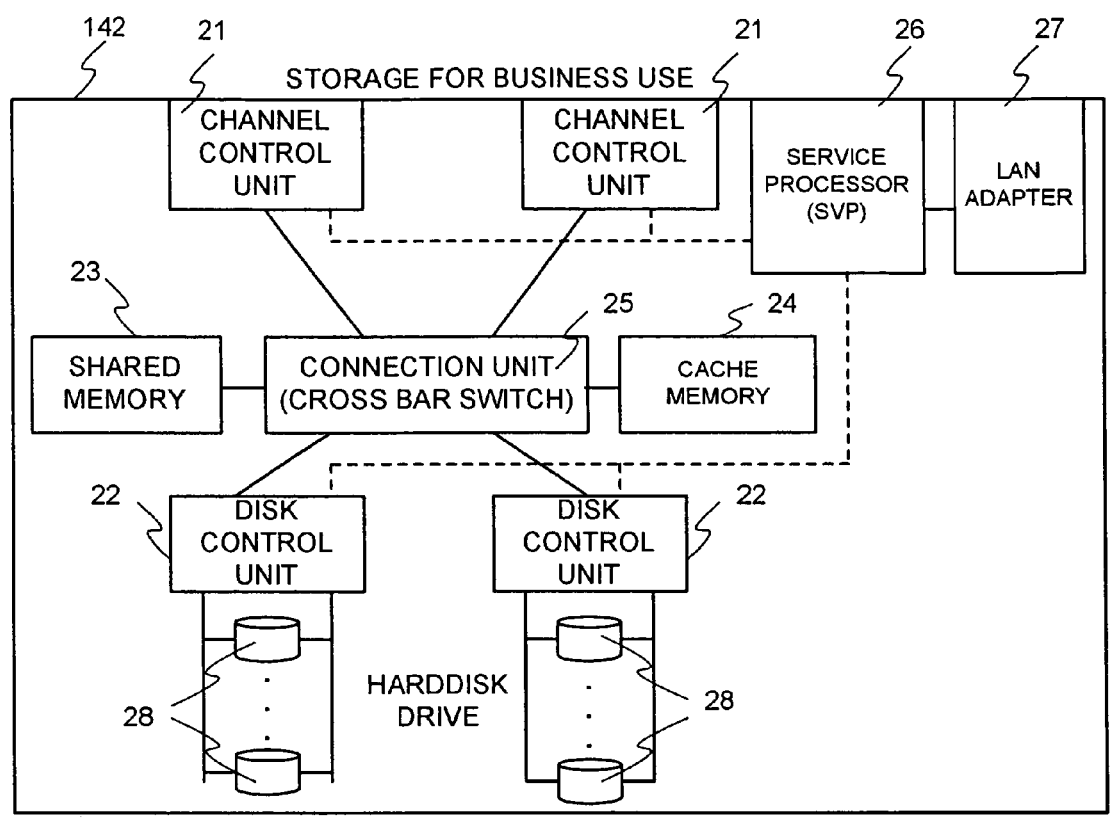
FIG. 1D is a view showing an example of a disk array device used as a storage for business use 142 described as the embodiment of the present invention.

A disk array device is used, for example, as the storage for business use 142. FIG. 1D shows an example of a disk array device used as the storage for business use 142. The storage for business use 142 is configured with one or more channel control units for communicating with the computer for business use 141, one or more disk control units 22, a shared memory 23, a cache memory 24, a connection unit (cross bar switch) 25, a service processor (SVP) 26 including a microcomputer for supplying services related to settings and control of the storage for business use 142 to the virtual resource operations management server 133, a LAN adapter 27 for connecting the storage for business use 142 to the network for business use 143, one or more hard disk drives 28 and so on. The computer for business use 141 and the storage for business use 142 are connected by a communication system such as LAN (Local Area Network), SAN (Storage Area Network), iSCSI (Internet Small Computer System Interface), ESCON (Enterprise Systems Connection) (registered trademark), FICON (Fiber Connection) (registered trademark), ACONARC (Advanced Connection Architecture) (registered trademark) or FIBARC (Fiber connection Architecture) (registered trademark) via the channel control unit 21.

The channel control unit 21 is provided with a CPU, a memory (ROM, RAM) and so on. These components are connected by an internal bus such as PCI (Peripheral Component Interconnect Bus). Upon receiving a data input/output request from the computer for business use 141, the channel control unit 21 writes a data input/output-related command corresponding to the request to the shared memory 23.

The disk control unit 22 reads or writes data from or to the hard disk drive 28 in conformity with the data write request received by the channel control unit 21. The disk control unit 22 is provided with a CPU, a memory and so on. These components are connected by an internal bus such as PCI. The disk control unit 22 exchanges data and commands with the channel control unit 21, the shared memory 23, the cache memory 24 and so on via the connection unit 25. The disk control unit 22 also reads or writes data from or to the hard disk drive 28. It is to be noted that the disk control unit 22 could be provided with the function (RAID control unit) to control the hard disk drive 28 with RAID (Redundant Array of Inexpensive Disks) levels (e.g., 0, 1, 5) defined in the so-called RAID system.

The storage area provided by the storage for business use 142 is managed in units of logical units (LUs)—a logical storage area. A logical unit ID (LUN (Logical Unit Number)), a specific identifier, is assigned to each logical unit. The storage for business use 142 associates a logical device (LDEV (Logical Device))—a storage area logically set using the physical storage area of the hard disk drive 28—with a logical unit. The storage for business use 142 sets a parity group, for example, in the RAID5 system as a logical device (LDEV). The computer for business use 141 identifies the storage area of the storage for business use 142 by specifying a logical unit ID (LUN). For example, when the operating system installed in the computer for business use 141 is a UNIX (registered trademark)-based operating system, logical unit IDs (LUNs) are associated with device files. On the other hand, when the operating system installed in an information processing apparatus 10 is a Windows (registered trademark)-based operating system, logical unit IDs (LUNs) are associated with drive letters (drive names).

The computer for business use 141 transmits a block-by-block data write/read request (hereinafter referred to as "data input/output request") to the storage for business use 142. A logical unit ID (LUN) is set in the data input/output request. Upon receiving the data input/output request from the computer for business use 141, the storage for business use 142 identifies the logical device corresponding to the logical unit ID (LUN), performing the processing related to the data write/read (hereinafter referred to as "data input/output") to or from the hard disk drive 28 making up the identified logical device. The storage for business use 142 may be a storage that functions as a NAS (Network Attached Storage) configured so as to accept data input/output requests by file name specification from the computer for business use 141 through a protocol such as NFS (Network File System). If the computer for business use 141 functions as a NAS, a file name is set in the data input/output request, allowing the storage for business use 142 to identify the storage area of the hard disk drive 28 from the file name.

The disk control unit 22 reads a data read/write (data input/output)-related command written to the shared memory by the channel control unit 21, performing the data read/write processing (data input/output processing) from or to the hard disk drive 28 in conformity with the command. The disk control unit 22 writes the data read from the hard disk drive 28 to the cache memory 24. The disk control unit 22 transmits a data write or read complete notice to the channel control unit 21 as appropriate. Upon receiving the complete notice, the channel control unit 21 transmits a response to the data input/output request to the computer for business use 141.

The shared and cache memories 23 and 24 are configured using rewritable memories such as RAM. Of these, the shared memory 23 primarily stores commands and data exchanged between the channel control unit 21 and the disk control unit 22. The cache memory 24 stores data to be written to or read from the hard disk drive 28, thus shortening the time required to write or read data to or from the hard disk drive 28 (access time) and enhancing the response function to the information processing apparatus 10.

The connection unit (cross bar switch) 25 connects the channel control unit 21, the disk control unit 22 and the shared and cache memories 23 and 24 to allow communication with each other. The connection unit 25 is configured, for example, using a high-speed bus such as an ultra-high-speed cross bar switch for data transfer through high-speed switching.

An OS (Operating System) 144 is running in the computer for business use 141. On the OS 144, a virtual OS (Operating System) 145 is running. The virtual OS 145 handles various real resources by virtualizing these resources. This allows a plurality of business applications 146 and business databases 147 to run in the single computer for business use 141. Among the real resources are a computer (information processing apparatus), a computer (information processing apparatus)'s CPU, a computer (information processing apparatus)'s memory, a hard disk drive (storage apparatus)'s storage area, an access path from the computer for business use 141 to the storage area of the hard disk drive 28 (storage device) of the storage for business use 142, a bandwidth and communication route of the network for business use 143, and a communication area of the network for business use 143. It is to be noted that the access path includes, for example, those paths identified by specifying HLU (Host Logical Unit), TID (Target ID) and Bus defined in the SCSI (Small Computer Systems Interface) communication standard, HPort (Host bus adapter Port), a communication port on the side of the computer for business use 141, DPort (Disk controller Port), a communication port on the side of the storage for business use 142, and LUN (Logical Unit Number).

The performance monitoring function 149 runs in each of the IT resources such as the computer for business use 141, the storage for business use 142 and the network for business use 143. The performance monitoring function 149 notifies the performance information of each IT resource to the virtual resource operations management server 133 via the network for business use 143. The specific details of notified performance information will be given later in the description regarding FIG. 7 that will be described later.

<Functional Description>

Figure 2:
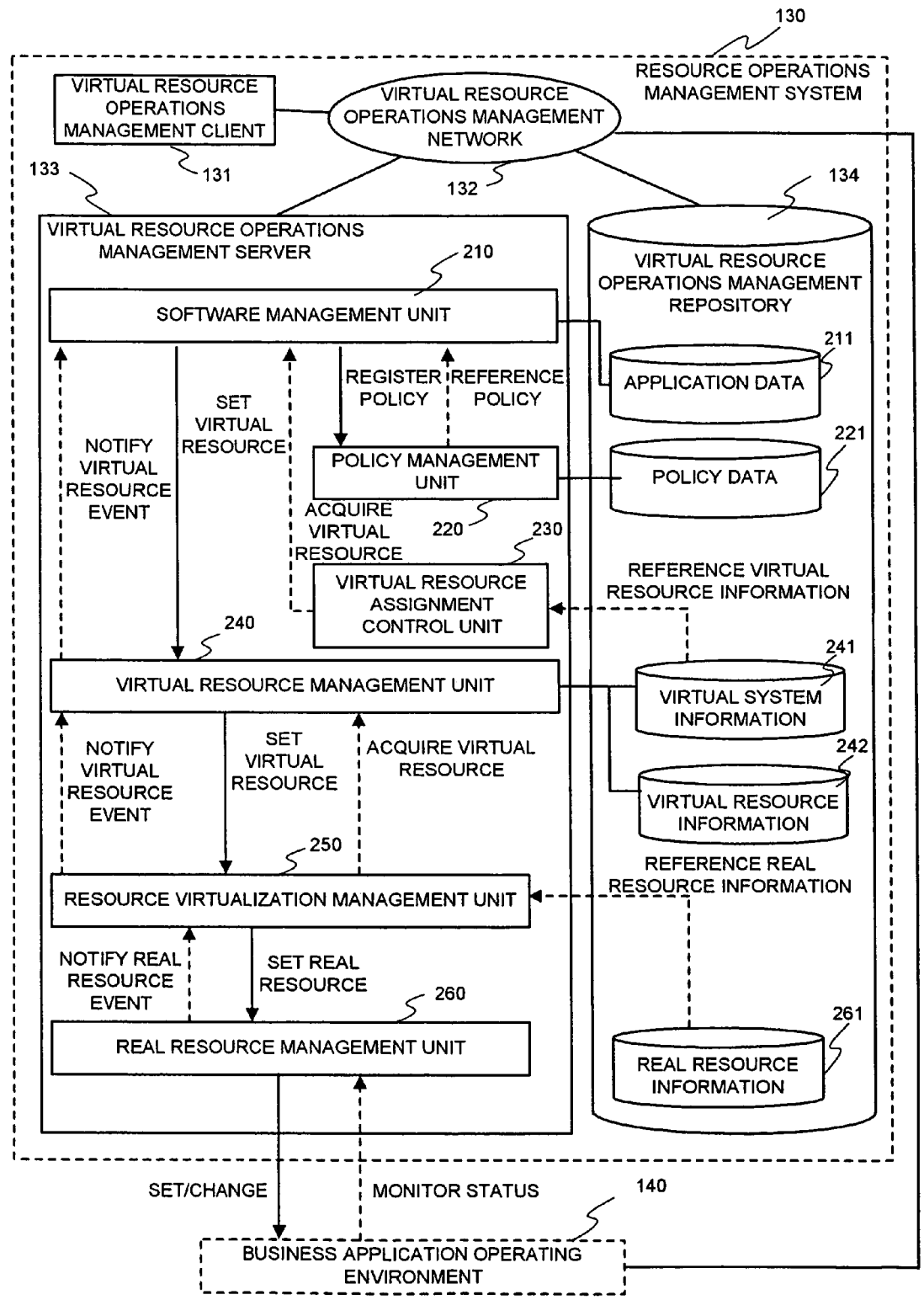
FIG. 2 is a view showing various functions and data implemented in the resource operations management system 130 described as the embodiment of the present invention.

FIG. 2 shows various functions and data implemented in the resource operations management system 130. In the virtual resource operations management server 133, various functions are implemented including a software management unit 210, a policy management unit 220, a virtual resource assignment control unit 230, a virtual resource management unit 240, a resource virtualization management unit 250, and a real resource management unit 260. These functions are implemented by hardware making up the virtual resource operations management server 133 or programs executed in the hardware. The virtual resource operations management repository 134 stores (memorizes/registers) application data 211, policy data 221, virtual system information 241, virtual resource information 242, real resource information 261 and so on. Of these, the application data 211 is managed by the software management unit 210. The policy data 221 is managed by the policy management unit 220. The virtual system information 241 and the virtual resource information 242 are managed by the virtual resource management unit 240. The real resource information 261 is managed by the real resource management unit 260.

FIG. 3 shows an example of the application data 211 stored in the virtual resource operations management repository 134 by the software management unit 210. The application data 211 includes configuration files—programs and data for implementing the business application 121—and SLO setup files—data in which SLOs/policies for the business application are written. An AP_ID column 311 of FIG. 3 contains, as a setting, an identifier (AP_ID) assigned to each piece of the application data 211. An AP name column 312 contains, as a setting, a name (AP name) that is an identifier assigned to the application data 211. A configuration file column 313 contains, as a setting, a file name of the configuration file. An SLO setup file column 314 contains, as a setting, a file name of the SLO setup file. The contents of the SLO setup files are policy data. It is to be noted that the virtual resource operations management repository 134 stores the substance of the files corresponding to these respective file names. A priority column 315 contains, as a setting, an execution priority of that business application 121. In this example, execution priorities "High", "Medium" and "Low" are set in descending order. It is to be noted that the real resources are assigned to the virtual resources in conformity with the execution priority as described later.

In the application data 211 of FIG. 3, the contents of the AP name and configuration file columns 312 and 313 are set in conformity with the contents of the business application 121 entered into the virtual resource operations management system 130 by the system operations administrator 110. On the other hand, the contents of the SLO setup file and priority columns 314 and 315 are set in conformity with the contents of the SLO/policy 122. It is to be noted that the policy management unit 220 stores (memorizes) the contents of the SLO/policy 122 in the virtual resource operations management repository 134 as the policy data written in a given description language.

FIG. 4 is an example of the policy data 221 stored (memorized) in the virtual resource operations management repository 134 by the policy management unit 220 as a result of expansion of the contents of the SLO/policy 122. A policy ID column 411 of FIG. 4 contains, as a setting, an identifier (policy ID) assigned to each piece of the policy data. FIG. 4 illustrates two pieces of the policy data 221 whose policy IDs are "1" and "2." A policy type column 412 contains, as a setting, information to indicate the type of the policy data 221.

In the example of FIG. 4, "Performance maintenance policy" and "Fault avoidance policy" are set as policy types; "Performance maintenance policy" is the policy data 221 for maintaining the performance and "Fault avoidance policy" the policy data 221 for avoiding faults. A condition column 413 contains, as a setting, information to indicate a condition (trigger) for applying the policy data 221. In the example of FIG. 4, "Performance degradation", "Overperformance", "Occurrence of equipment fault", "Occurrence of center fault" and so on are set as conditions (triggers) for applying the policy data. An action column 414 contains, as a setting, information to indicate an action to be applied. Details of action column 415 contains, as a setting, the details of an action to be applied. FIG. 4 illustrates, as specific details of actions, the actions corresponding to the respective conditions such as upgrading the assignment of the real resource to the virtual resource of the bottleneck portion, releasing the real resource assigned to the virtual resource of the excess portion, changing the assignment of the real resources to the faulty virtual resource and moving the AP and virtual resource to a sound data center. It is to be noted that the above-described policy data is actually written in a given description language interpretable by the policy management unit 220 (or information processing apparatus (computer)) and stored in the virtual resource operations management repository 134.

FIG. 5 is an example of the virtual system information 241 managed by the virtual resource management unit 240 and stored in the virtual resource operations management repository 134. The virtual system configuration is managed in the virtual system information 241. It is to be noted that the virtual system refers to a system configured with virtual resources to which real resources are assigned in the hosting environment (execution environment) of the business application 121. A virtual system ID column 511 of FIG. 5 contains, as a setting, an identifier (virtual system ID) assigned to each of the virtual systems. An assigned AP_ID column 512 contains, as a setting, an AP_ID of the business application 121 that uses the virtual system as the hosting environment. A configuration virtual resource ID column 513 contains, as a setting, an identifier of the virtual resource (virtual resource ID) that makes up the virtual system. It is to be noted that the settings of the virtual system information 241, i.e., the tasks of assigning the business applications 121 to the virtual systems and associating the virtual systems with the virtual resources are carried out as the virtual resource assignment control unit 230 references the resource virtualization management unit 250.

FIG. 6 shows an example of the virtual resource information 242 stored in the virtual resource operations management repository 134. Here, the virtual resources refer to virtual resources that are configured by assigning the applicable real resources as the business application operating environment 140. The real resources are assigned to the virtual resources in various forms, including assignment of the single real resource to the single virtual resource, assignment of the single real resource to the plurality of virtual resources and assignment of the plurality of real resources to the single virtual resource. A virtual resource ID column 611 of FIG. 6 contains, as a setting, an identifier (virtual resource ID) assigned to each of the virtual resources. A resource type column 612 contains, as a setting, information that indicates the resource type.

In FIG. 6, "Computer", "Storage", "Network" and others are set as the virtual resource types. A performance/capacity column 613 contains, as a setting, a virtual resource performance and capacity. In FIG. 6, as for the virtual resource information 242 for which "Computer" is set in the resource type column 612, the performance/capacity column 613 contains, as a setting, a clock frequency of the CPU 41 of the computer 40 and a capacity of the memory 42 of the computer 40. It is to be noted that as for the virtual resource information 242 indicated by a sign 621, two real resource IDs, "023" and "024", are set. This virtual resource is configured using the two computers 40. In this case, the clock frequency of the CPU 41 in the performance/capacity column 613 contains, as a setting, the sum of the clock frequencies of the computers 40. As for the capacity of the memory 42 set in the performance/capacity column 613, the column contains, as a setting, the sum of the capacities of the memories 42 in the two computers 40. Thus, when the virtual resource information 242 is made up of a plurality of the real resources, the performance/capacity column 613 contains, as a setting and as necessary, an evaluation value that can be obtained with an appropriate method to show the performance of that virtual resource. As for the virtual resource information 242 for which "Storage" is set in the resource type column 612, the performance/capacity column 613 contains, as a setting, a storage capacity of the storage for business use 142. As for the virtual resource information 242 for which "Network" is set in the resource type column 612, the performance/capacity column 613 contains, as a setting, a communication speed of the network for business use 143. It is to be noted that the communication speed that may be set includes the maximum communication speed and the time average of the communication speed.

A virtual identifier column 614 of FIG. 6 contains, as a setting, an identifier (virtual identifier) used to identify that virtual resource and specifically assigned to each of the virtual resources. In the example of FIG. 6, as for the virtual resource information 242 for which "Computer" is set in the resource type column 612, the virtual identifier column 614 contains, as a setting, an IP address virtually set for the virtual resource configured with the computer 40. As for the virtual resource information 242 for which "Storage" is set in the resource type column 612, the virtual identifier column 614 contains, as a setting, a partition ID, a partition identifier set for the virtual resource configured with the hard disk drive 28 of the storage for business use 142. As for the virtual resource information for which "Network" is set in the resource type column 612, the virtual identifier column 614 contains, as a setting, a VLAN_ID, an ID set for the virtual resource configured with the network for business use 143. A real resource ID column 615 of FIG. 6 contains, as a setting, a real resource ID that is a real resource identifier. It is to be noted that information (data) about the real resources is managed in the real resource information 261 that is stored in the virtual resource operations management repository 134 described next in FIG. 7.

Figure 7:
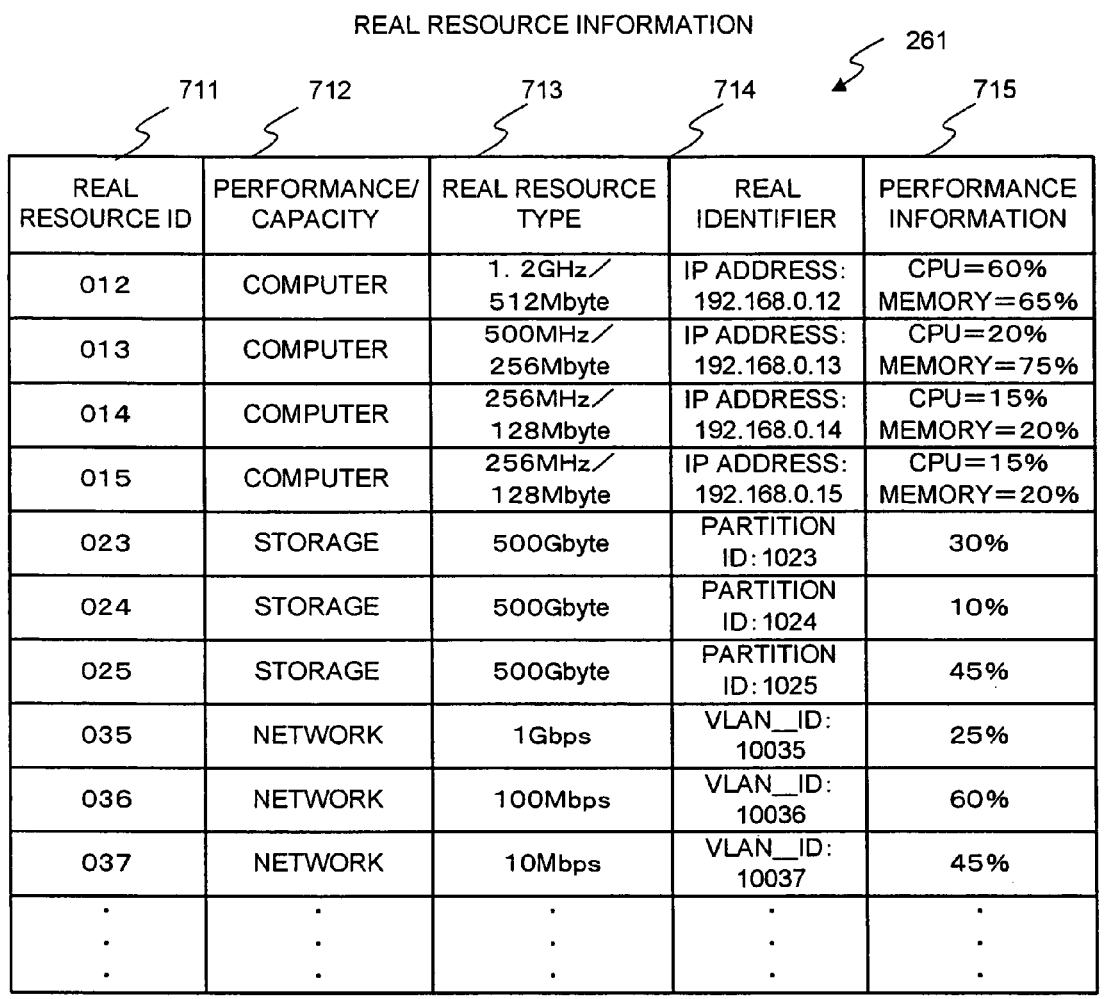
FIG. 7 is a view showing an example of real resource information 261 described as the embodiment of the present invention.

FIG. 7 shows an example of the real resource information 261 stored in the virtual resource operations management repository 134 by the real resource management unit 260. The real resource information 261 contains, as settings, information about the computer for business use 141, the storage for business use 142 and the network for business use 143 in the business application operating environment 140.

A real resource ID column 711 contains, as a setting, a real resource ID that is an identifier assigned to the real resource. A real resource type column 712 contains, as a setting, information that indicates the real resource type. A performance/capacity column 713 contains, as a setting, a real resource performance and capacity. In the example shown in FIG. 7, as for the real resource information 261 for which "Computer" is set in the real resource type column 712, the performance/capacity column 713 contains, as a setting, a clock frequency of the CPU 41 and a capacity of the memory 42. As for the real resource information 261 for which "Storage" is set in the real resource type column 712, the performance/capacity column 713 contains, as a setting, a storage capacity of that storage. As for the real resource information 261 for which "Network" is set in the real resource type column 712, the performance/capacity column 713 contains, as a setting, a communication speed of the network for business use 143. It is to be noted that the communication speed that may be set includes the maximum communication speed and the time average of the communication speed.

A real identifier column 714 contains, as a setting, an identifier used to identify that real resource. In the example of FIG. 7, as for the real resource information 261 for which "Computer" is set in the real resource type column 712, the real identifier column 714 contains, as a setting, an IP address assigned to that computer 40 in the network for business use 143. As for the real resource information 261 for which "Storage" is set in the real resource type column 712, on the other hand, the real identifier column 714 contains, as a setting, a partition ID assigned to the storage area of the hard disk drive 28 of that storage for business use 142. A partition ID is set, for example, by associating the ID with a logical unit ID (LUN). As for the real resource information 261 for which "Network" is set in the real resource type column 712, the real identifier column 714 contains, as a setting, a VLAN_ID, an identifier on the VLAN (Virtual Local Area Network) assigned to the network for business use 143.

A performance information column 715 contains, as a setting, information notified to the resource operations management system 130 by the respective performance monitoring functions 149 of the computer for business use 141, the storage for business use 142 and the network for business use 143. In the example of FIG. 7, as for the real resource information 261 for which "Computer" is set in the real resource type column 712, the performance information column 715 contains, as a setting, a utilization rate (operation rate) of the CPU 41 and a utilization rate (consumption) of the memory 42. As for the real resource information 261 for which "Storage" is set in the real resource type column 712, on the other hand, the performance information column 715 contains, as a setting, a utilization amount (consumption) of the storage area of the corresponding hard disk drive 28. As for the real resource information 261 for which "Network" is set in the real resource type column 712, the performance information column 715 contains, as a setting, a utilization rate (traffic per unit time) of the network for business use 143. The contents of the performance information column 715 are updated when necessary by the notices from the performance monitoring functions.

<Description of Processings>

Figure 8:
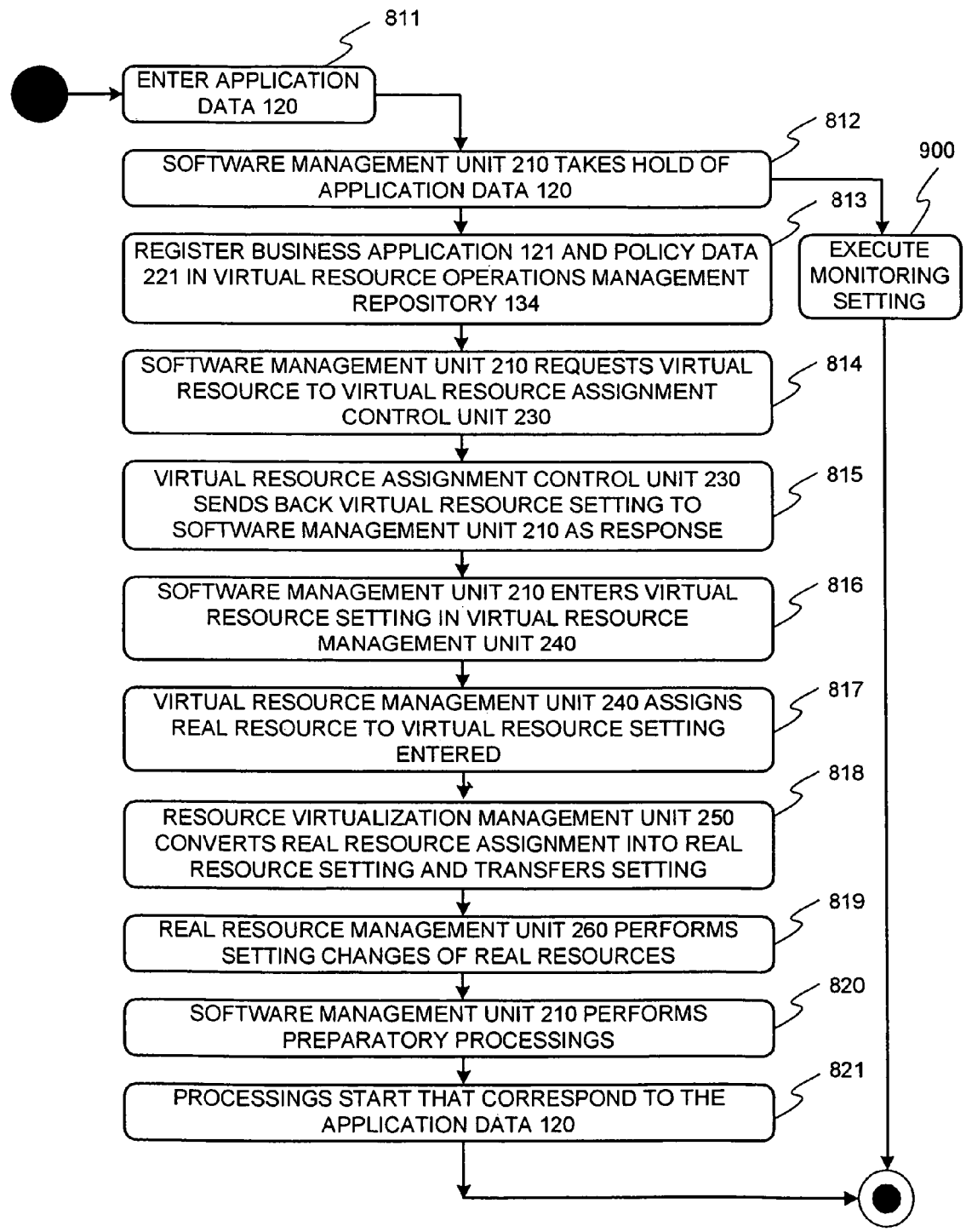
FIG. 8 is a UML (Unified Modeling Language) activity diagram describing the processings, described as the embodiment of the present invention, performed in the resource operations management system 130 when a system operations administrator 110 enters (sets or registers) application data 120 in the virtual resource operations management server 133 by manipulating the virtual resource operations management client 131.

Detailed description will be given next of the various functions implemented in the resource operations management system 130. FIG. 8 is a UML (Unified Modeling Language) activity diagram describing the processings performed in the resource operations management system 130 when the system operations administrator 110 enters the application data 120 in the virtual resource operations management server 133 by manipulating the virtual resource operations management client 131.

First, the system operations administrator 110 enters the application data 120 in the virtual resource operations management server 133 by manipulating the virtual resource operations management client 131 (811). The application data 120 entered from the virtual resource operations management client 131 is handed over to the software management unit 210 in the virtual resource operations management server 133. The software management unit 210 holds the application data 120 that has been handed over (812). The software management unit 210 registers the business application 121 included in the application data 120 in the virtual resource operations management repository 134 as the application data 211. The software management unit 210 also registers the SLO/policy 122 of the application data 120 that has been handed over in the virtual resource operations management repository 134 as the policy data 221 (813).

Next, the virtual system, a hosting environment of the business application 121, is configured based on the policy data 221 registered in the virtual resource operations management repository 134. First, the software management unit 210 requests a virtual resource for configuring the hosting environment to the virtual resource assignment control unit 230 (814). In response to the request from the software management unit 210, the virtual resource assignment control unit 230 sets the virtual resource for configuring the hosting environment, sending back the set virtual resource (hereinafter referred to as "virtual resource setting") to the software management unit 210 as a response (815). The software management unit 210 enters the virtual resource setting sent back from the virtual resource assignment control unit 230 in the virtual resource management unit 240 (816).

Next, the virtual resource management unit 240 assigns a real resource to the virtual resource setting entered from the software management unit 210 (817). The resource virtualization management unit 250 converts the setting in relation to the assignment of the real resource to the virtual resource by the virtual resource management unit 240 into a real resource setting and transfers the converted real resource setting to the real resource management unit 260 (818). Upon receiving the real resource setting transferred, the real resource management unit 260 performs setting changes of the individual real resources via the virtual resource operations management network 132 in conformity with the setting (819).

The above processings allow the processings for the application data 120, entered into the virtual resource operations management server 133, to run in the hosting environment (virtual system) configured as described above.

Next, the software management unit 210 performs preparatory processings to process the application data 120 on the hosting environment (virtual system) configured as described above (820). These preparatory processings include setting the individual real resources, distributing programs and data to the individual real resources and so on. At the completion of the preparatory processings, the software management unit 210 starts the processings corresponding to the application data 120 (821). In this manner, the processings begin in the hosting environment in relation to the application data 120 entered into the virtual resource operations management server 133.

On the other hand, the software management unit 210 begins the processings in relation to the monitoring setting that will be described next, for example, when taking hold of the application data 120 (812).

Figure 9:
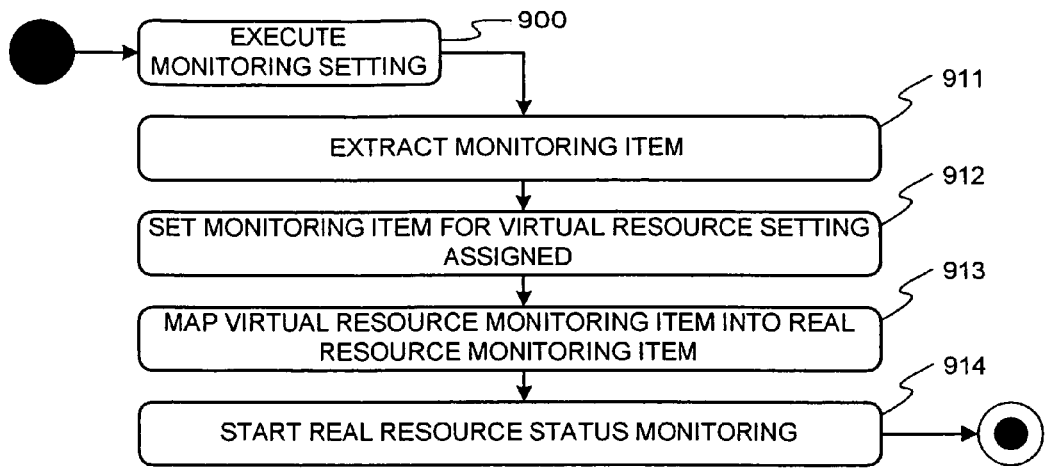
FIG. 9 is a UML activity diagram describing the processings related to a monitoring setting described as the embodiment of the present invention.

FIG. 9 is a UML activity diagram describing the processings related to the resource monitoring setting. First, the policy management unit 220 references the policy data 221 registered in the virtual resource operations management repository 134 in response to a request from the software management unit 210. Then, the policy management unit 220 extracts an item to be monitored (hereinafter referred to as "monitoring item") and sends back the extracted monitoring item as a response (911). Next, the software management unit 210 sets a monitoring item for the virtual resource setting assigned to the virtual resource management unit 240 in the processings of FIG. 8 (912). Then, the virtual resource management unit 240 maps (converts) the monitoring item for the virtual resource setting set using the resource virtualization management unit 250 into the real resource monitoring item (913). The real resource management unit 260 receives the real resource monitoring item and starts the status monitoring of the real resource for the received monitoring item (914).

The above processings allow the status monitoring of the resource to be performed for the application data 120 entered into the virtual resource operations management server 133.

Figure 10:
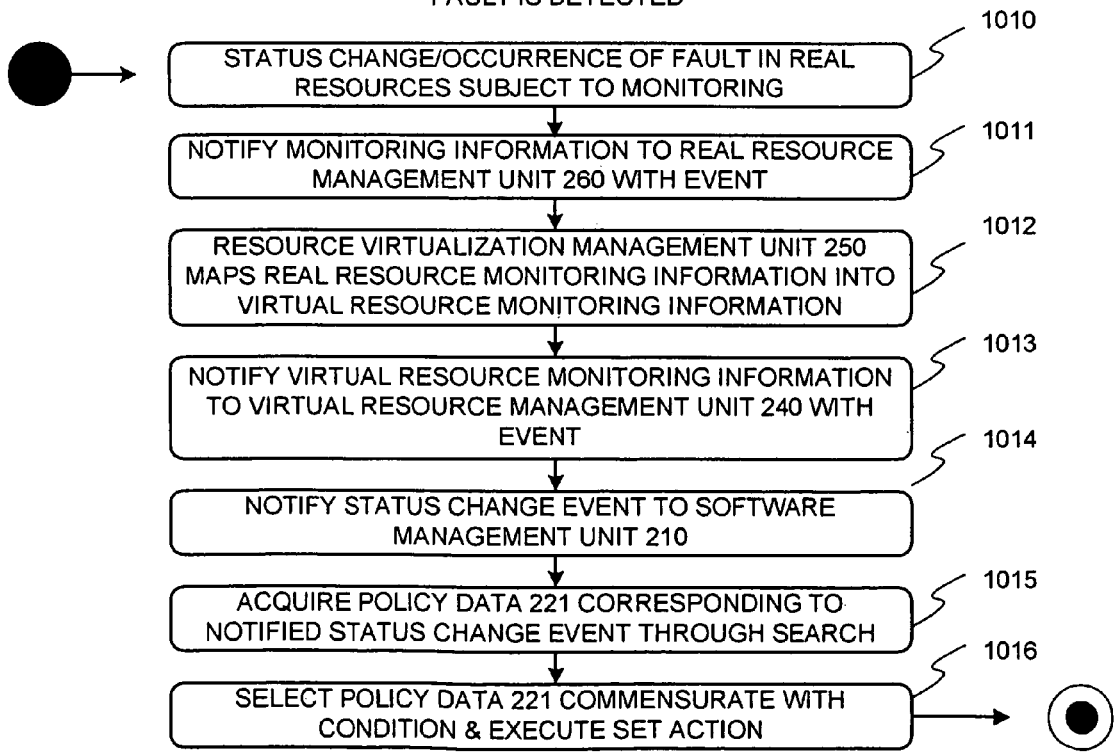
FIG. 10 is a UML activity diagram describing the processings performed if a performance monitoring function 149 described as the embodiment of the present invention detects a performance degradation or occurrence of a fault in real resources subject to the status monitoring.

FIG. 10 is a UML activity diagram describing the processings performed if the performance monitoring function 149 detects a performance degradation or occurrence of a fault in the real resources subject to the status monitoring. In the event of a status change or fault in a real resource (1010), the performance monitoring function 149 notifies to the real resource management unit 260 an event to the effect that a status change or fault has been detected, together with monitoring information—information related to the real resource monitoring (1011). Upon receiving the monitoring information, the real resource management unit 260 maps (converts) the real resource monitoring information into virtual resource monitoring information using the resource virtualization management unit 250 (1012). The real resource management unit 260 notifies the mapping result to the virtual resource management unit 240 (1013). Next, upon receiving the virtual resource monitoring information, the virtual resource management unit 240 notifies the software management unit 210 that changes have been made to the hosting environment (virtual system) of the business application 121 that uses the virtual resource (the virtual resource management unit 240 notifies a status change event) (1014).

Upon receiving the status change event, the software management unit 210 searches for the policy data 221 registered in the virtual resource operations management repository 134, acquiring the policy data 221 corresponding to the received status change event via policy management unit (1015). Then, the software management unit 210 selects, from among the policy data 221 acquired, the policy data 221 commensurate with the contents of the event, executing the action set in the policy data (1016).

Figure 11:
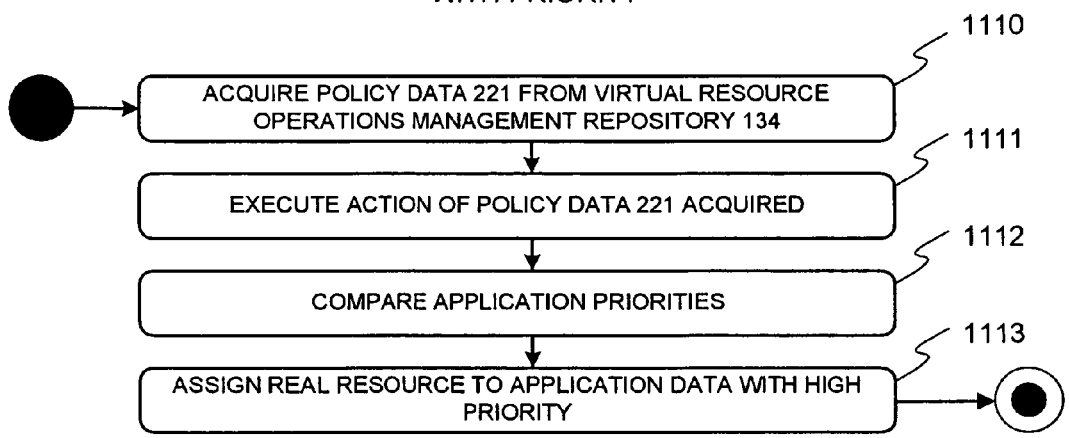
FIG. 11 is a UML activity diagram describing the processings, described as the embodiment of the present invention, performed in the virtual resource operations management server 133 when an action is executed to increase (upgrade) real resources (computers) in conformity with the priority set in a business application 121.

FIG. 11 is a UML activity diagram describing the processings of the virtual resource operations management server 133 performed to increase (upgrade) the real resources (computers 40) in conformity with the priority set in the business application 121 if the virtual resource operations management server 133 receives a CPU performance degradation event from the performance monitoring function in the business application operating environment 140 when the single real resource is shared by the plurality of virtual resources. First, the software management unit 210 acquires the policy data 221 corresponding to the CPU performance degradation from the virtual resource operations management repository 134 (1110). Next, the software management unit 210 executes the action corresponding to the policy data 221 acquired (1111). Here, we assume that the processing is performed for upgrading the real resources (computers 40) in conformity with the priority 315 in the application data 211 as the action.

The software management unit 210 compares the priorities set in the individual pieces of application data 211 that is set to function in the virtual resource to which the real resource (computer 40) with degraded performance of the CPU 41 is assigned (1112) in conformity with the priority set in the application data 211. The virtual resource assignment control unit 230 reassigns the real resource, assigned to the virtual resource of a piece of application data 211 set with a low priority, to the virtual resource of a piece of the application data 211 set with a higher priority than the piece of application data 211 (1113). This allows the software management unit 210 to upgrade the real resources assigned to the virtual resources of the applications with higher priorities.

The above processings upgrade the virtual resources in the event of performance degradation. As these processings are dynamically performed in response to occurrence of an event, a stable operating environment can be provided so as to meet the processing performance requested of each of the business applications 146 executed in the business application operating environment 140. It is to be noted that the real resource information 261 is basically hidden from the business applications 146 at the time of the processings shown in FIG. 11. This makes it possible to increase or degrease the real resources for executing the business applications 146 without any setting changes on the side of the business applications 146. Additionally, the real resources can be smoothly assigned to the business applications 146. This allows curbing the work burden on the system operations administrator 110, etc. and the operational cost of the business application operating environment 140.

According to the present invention, resources can be assigned in a storage system without any setting changes on the business application side.

While an embodiment of the present invention has been described hereinabove, the aforementioned embodiment is for the sake of an easier understanding of the present invention and not intended to limit the scope of the present invention. It is needless to say that the present invention can be modified or improved upon without departing from the spirit of the invention and that the present invention encompasses equivalents thereof.

What is claimed is:

1. A resource operations management system for managing operations of real resources in a storage system including an information processing apparatus and a storage apparatus communicably connected to the information processing apparatus via a communication network, the storage apparatus writing or reading data to or from a storage device in response to a data write/read request transmitted from the information processing apparatus, the resource operations management system comprising:
   a virtual resource management unit for setting virtual resources by assigning the real resources; and
   a real resource management unit for managing performance status of the real resources,
   wherein the virtual resource management unit changes the settings in conformity with occurrence of overperformance of the operating status of the real resources and reduces the real resources assigned to the virtual resources.

2. The resource operations management system of claim 1, further comprising a policy management unit for managing policy data that is data for specifying an execution environment of software, wherein the virtual resource management unit changes the settings in conformity with the operating status of the real resources and the policy data.

3. The resource operations management system of claim 2, further comprising a software management unit for accepting entry of programs and data making up the software and of the policy data, wherein the virtual resource management unit changes the settings in conformity with the operating status of the real resources and the accepted policy data.

4. The resource operations management system of claim 1, wherein the real resource management unit manages the performance of the real resources or the presence/absence of a fault occurrence in the real resources as the operating status.

5. The resource operations management system of claim 1, wherein the virtual resource management unit changes the settings by increasing or decreasing the assignments of the real resources to the virtual resources or by reassigning the real resources assigned to the virtual resource to the other real resource.

6. The resource operations management system of claim 1, wherein the virtual resource management unit changes the settings by assigning one of the real resources to a plurality of the virtual resources or by assigning a plurality of the real resources to one of the virtual resources.

7. The resource operations management system of claim 1, wherein the software management unit hides real resource information that is information about the real resources making up the virtual resources, from the software.

8. The resource operations management system of claim 1, wherein the real resources include at least any one of the information processing apparatus, a CPU of the information processing apparatus, a memory of the information processing apparatus, a storage area of the storage device, an access path from the information processing apparatus to the storage area of the storage device, a bandwidth of the communication network, a communication route of the communication network, and a communication area of the communication network.

9. The resource operations management system of claim 1, wherein the real resource is the information processing apparatus, wherein the virtual resource management unit assigns the real resource to the virtual resources by associating an identifier that is assigned to any one of the information processing apparatus, a CPU of the information processing apparatus, a memory of the information processing apparatus, a storage area of the storage device, an access path from the information processing apparatus to the storage area of the storage device, and a bandwidth of the communication network, a communication route of the communication network, and a communication area of the communication network, with an identifier assigned to each of the virtual resources.

10. A method of managing real resource operations in a storage system including an information processing apparatus and a storage apparatus communicably connected to the information processing apparatus via a communication network, the storage apparatus writing or reading data to or from a storage device in response to a data write/read request transmitted from the information processing apparatus, the method comprising the steps of:

setting virtual resources by assigning the real resources;

managing the overperformance status of the real resources; and changing the settings in conformity with the overperformance status of the real resources and reduces the real resources assigned to the virtual resources.

11. A resource operations management system for managing operations of real resources in a storage system including an information processing apparatus and a storage apparatus communicably connected to the information processing apparatus via a communication network, the real resources including a CPU and a memory, the storage apparatus writing or reading data to or from a storage device in response to a data write/read request transmitted from the information processing apparatus, the resource operations management system comprising:

a virtual resource management unit for setting virtual resources by assigning the real resources; and a real resource management unit for managing the operating status of the real resources, a policy management unit for managing policy data that is data for specifying an execution environment of software; and a software management unit for accepting entry of programs and data making up the software, wherein when the virtual resource management unit changes the setting by assigning the single real resource to the plurality of virtual resources or by assigning the plurality of real resources to the single virtual resource according to a utilization rate of the CPU, a utilization amount of the memory, or a utilization rated of the communication network, the software management unit assigns the real resources to the virtual resources in conformity with the priority of the software set as the policy data.

12. A resource operations mangement system for managing operations of real resources in an information processing system including real resources including a CPU, a memory, and a storage apparatus, the resource operations management system comprising:

a virtual resource management unit for setting virtual resources by assigning the real resources; and a real resource management unit for managing the operating status of the real resources, a policy management unit for managing policy data that is data for specifying an execution environment of software; and wherein the policy data include a performance maintenance policy for maintaining the performance, the virtual resources management unit changes the setting in conformity with the operation status of the real resources and the policy data, wherein when the performance maintenance policy indicates over performance as the operating status of the real resources for virtual resources, the real resources assigned to the virtual resources are reduced.

13. A resource operations management system for managing operations of real resources in an information processing system including real resources including a CPU, a memory, and a storage apparatus, the resource operations management system comprising:

a virtual resource operations management unit for setting virtual resources by assigning the real resources; and a real resource management unit for managing the operating status of the real resources, a policy management unit for managing policy data that is data for specifying an execution environment of software; and wherein the policy data include a performance maintenance policy for maintaining the performance, the virtual resources management unit changes the setting in conformity with the operating status of the real resources and policy data, wherein when the performance maintenance policy indicates degradation of performance as the operating status of the real resources for the virtual resources, the real resources assigned to the virtual resources are expanded.

14. A resource operations management system for managing operations of real resources in an information processing system including real resources including a CPU, a memory, and a storage apparatus, the resource operations management system comprising:

a virtual resource management unit for setting virtual resources by assigning the real resources; and a real resource management unit for managing the operating status of the real resources, a policy management unit for managing policy data that is data for specifying an execution environment of software; and wherein the policy data include a performance maintenance policy for maintaining the performance, the virtual resources management unit changes the setting in conformity with the operating status of the real resources and the policy data, wherein information of the operating status includes performance information, and the performance information includes a utilization rate of the CPU and utilization amount of the memory.

15. A resource operations management system for managing operations of real resources in an information processing system including real resources including a CPU, a memory, and a storage apparatus, the resource operations management system comprising:

a virtual resource management unit for setting virtual resources by assigning the real resources; and a real resource management unit for managing the operating status of the real resources, a policy management unit for managing policy data that is data for specifying an execution environment of software; and wherein the policy data include a performance maintenance policy for maintaining the performance, the virtual resources management unit changes the setting in conformity with the operating status of the real resources and the policy data, wherein information of the operating status includes performance information, and the performance information includes a utilization rate of the network connected to the information processing system.

16. A resource operations management system for managing operations of real resources in an information processing system including real resources including a CPU, a memory, and a storage apparatus, the resource operations management system comprising:

a virtual resource management unit for setting virtual resources by assigning the real resources; and a real resource management unit for managing the operating status of the real resources, a policy management unit for managing policy data that is data for specifying an execution environment of software; and wherein the policy data include a performance maintenance policy for maintaining the performance, the virtual resources management unit changes the setting in conformity with the operating status of the real resources and the policy data, wherein a priority is set to an application executed on the information processing system, and the virtual resources management unit changes the setting in conformity with the operating status of the real resources, the policy data, or the priority.

* * * * *